United States Patent [19]
Ward

[11] Patent Number: 4,520,303
[45] Date of Patent: May 28, 1985

[54] INDUCTION MOTORS

[75] Inventor: Philip A. Ward, Staffordshire, England

[73] Assignee: Associated Electrical Industries Limited, England

[21] Appl. No.: 580,558

[22] Filed: Feb. 15, 1984

[30] Foreign Application Priority Data

Feb. 21, 1983 [GB] United Kingdom ............... 8304714

[51] Int. Cl.³ .............................................. H02P 1/42
[52] U.S. Cl. .................................... 318/778; 318/786; 318/812
[58] Field of Search ............... 318/786, 778, 779, 749, 318/754, 812

[56] References Cited

U.S. PATENT DOCUMENTS 4,060,754 11/1977 Kirtlej, Jr. et al. ............... 318/768

FOREIGN PATENT DOCUMENTS

| EPA27524 | 4/1981 | United Kingdom . |
| EPA31688 | 7/1981 | United Kingdom . |
| EPA53208 | 6/1982 | United Kingdom . |
| GBA2092401 | 8/1982 | United Kingdom . |

Primary Examiner—David Smith, Jr.
Attorney, Agent, or Firm—Kirschstein, Kirschstein, Ottinger & Israel

[57] ABSTRACT

A self-starting single phase induction motor wherein the required quasi-second phase for starting is provided by controlling the phase of the voltage applied to one stator winding (91) of the motor relative to the phase of the voltage applied to another stator winding (87) of the motor by means of an electronic switching arrangement (93) and an associated control circuit (95).

5 Claims, 9 Drawing Figures

INDUCTION MOTORS

This invention relates to single phase induction motors.

In order for a single phase induction motor to be self-starting it is necessary to provide a quasi second phase. On very small motors, where poor efficiency can be tolerated, this is frequently done using so-called pole shading techniques. On larger motors an auxiliary winding fed from the single phase supply via a capacitor is often provided.

It is an object of the present invention to provide a single phase induction motor incorporating a novel arrangement for providing a quasi second phase for starting purposes.

According to the present invention a single phase induction motor comprises: a first winding arranged for energisation from a single phase supply; a second winding arranged for energisation from said supply via an electronic switching arrangement; and control means arranged to control the operation of said switching arrangement in synchronism with the supply so that the phases of the voltages across said first and second windings differ by an amount sufficient to provide a starting torque.

In one particular arrangement in accordance with the invention the second winding comprises two portions and said switching arrangement and control means serve to connect the two portions for energisation from the supply alternately with a changeover from energisation of one portion to energisation of the other portion occurring during each half cycle of the supply voltage, the two portions being arranged to provide, when energised, magnetic fields of opposite sense. In one embodiment of such an arrangement the switching arrangement comprises two transistors connected in a bistable circuit arrangement with each transistor having its main current path connected in series with a respective one of the two portions of the second winding across said supply via a full wave rectifying arrangement, and the control means serves to trigger the bistable circuit arrangement during each half cycle of the supply voltage.

In a second particular arrangement in accordance with the invention said second winding has one end connected to a tapping point on said first winding and its other end respectively connected via respective switches of said switching arrangement to the output terminals of a full wave rectifying arrangement whose input terminals are connected with said supply, and said control means is arranged to cause said switches to conduct alternately with a changeover from conduction of one switch to the other during each half cycle of the supply voltage.

In a third particular arrangement in accordance with the invention the switching arrangement comprises a bidirectional switch connected in series with said second winding across said supply, and said control means serves to close said switch during a part of each half cycle of the supply voltage.

We are aware of single phase induction motor arrangements such as that described in U.S. Pat. No. 4,307,327-A in which a start winding is connected in parallel with a main winding via a switching arrangement. However, in such arrangements the function of the switching arrangement is solely to restrict the supply of current to the starting winding to a starting period, i.e. to perform the same function as the mechanical centrifugal switch incorporated in conventional self starting single-phase induction motors. The required quasi-second phase for starting is obtained by virtue of the relative impedances of the main and start windings and not by virtue of control of the switching arrangement by control means so that the phases of the voltages applied to first and second windings differ, as in a motor according to the present invention.

Four single phase induction motors in accordance with the invention will now be described, by way of example, with reference to the accompanying drawings in which.

Figure 1:
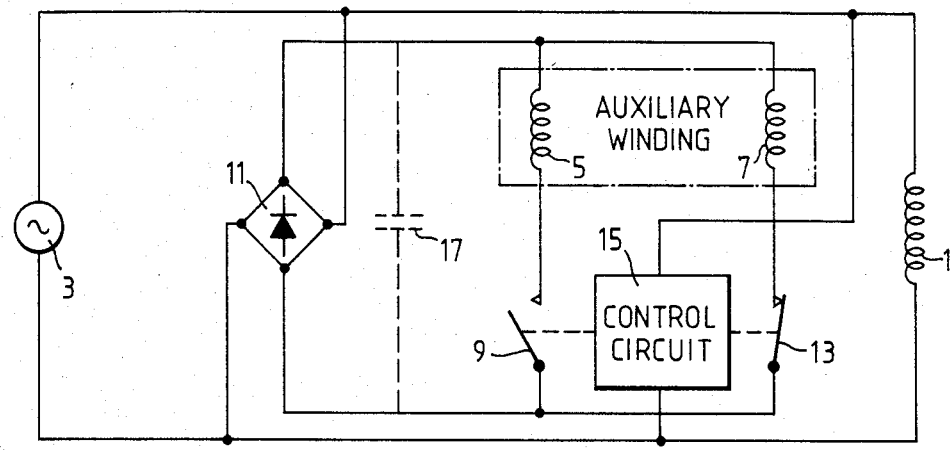
FIG. 1 is a circuit diagram of the first motor to be described.

Referring to FIG. 1, the first motor to be described includes a conventional main first stator winding 1 arranged for energisation from an alternating current supply 3.

The stator is also provided with an auxiliary second winding comprising two portions 5 and 7.

One of the winding portions 5 is connected in series with a semiconductor switch 9 between the output terminals of a bridge full wave rectifying arrangement 11 energised from the supply 3. The other winding portion 7 is similarly connected across the rectifying arrangement 11 via a second semiconductor switch 13.

The switches 9 and 13 are operated by a control circuit 15.

In operation of the motor, a full wave rectified voltage of the waveform illustrated in FIG. 2b appears across the series connection of each winding portion 5 or 7 and the associated switch 9 or 13. Under control of the circuit 15 the switches 9 and 13 conduct alternately, the switch 9 becoming conducting near each peak of one set of alternate half cycles of the supply voltage (see FIGS. 2a) and the switch 13 becoming conducting near each peak of the other set of alternate half cycles of the supply.

The output voltage of the full wave rectifying arrangement is thus applied alternately to the winding portions 5 and 7, as illustrated in FIGS. 2c and 2d.

The winding portions 5 and 7 are arranged so that the magnet fields applied to the motor rotor (not shown) by the two portions, when energised, are in opposite senses. The winding portions 5 and 7 thus together produce the same magnetic effect as a single winding to which is applied to a voltage of the form shown in FIG. 2e.

As will be seen, although containing many harmonics, the voltage illustrated in FIG. 2e has a fundamental component shifted by about 90° with respect to the supply voltage applied to the main motor winding 1, thus providing the quasi second phase required for self-starting of the motor.

Figure 2:
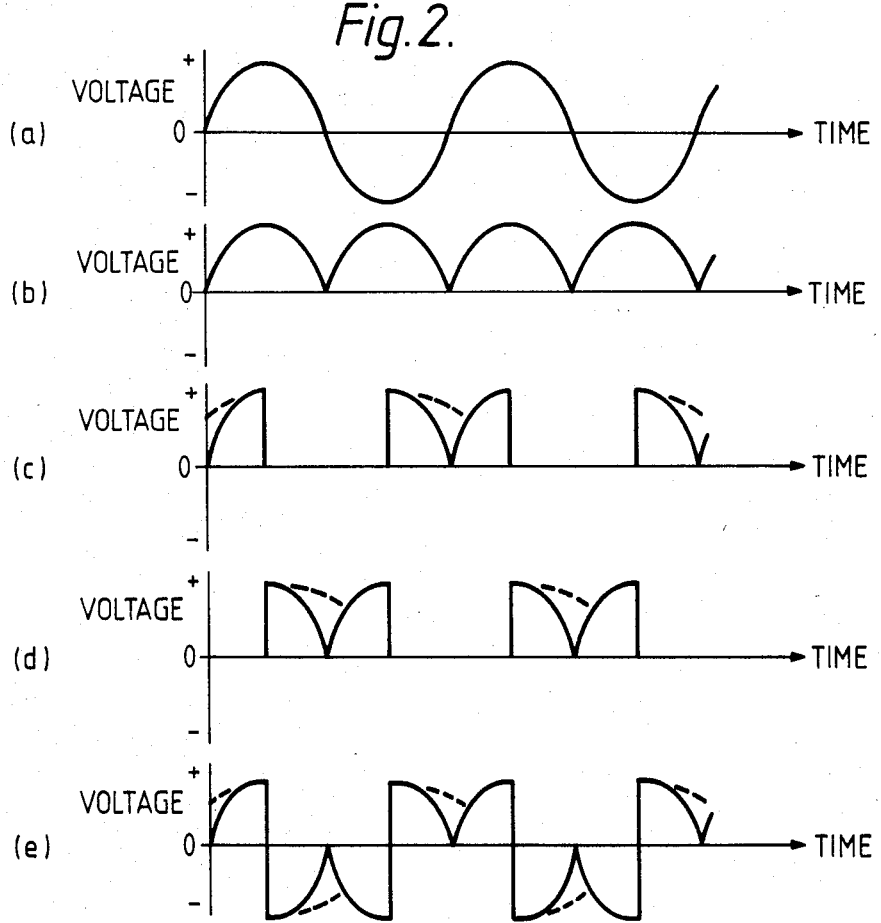
FIG. 2 illustrates the waveforms of certain voltages appearing in the motor of FIG. 1 in operation.

If desired, a smoothing capacitor 17 may be connected across the output of the rectifying the arrangement 11 to reduce the harmonic components of the voltages applied to the winding portions 5 and 7, as illustrated by the dotted lines in the FIGS. 1 and 2.

It will be appreciated that the auxiliary winding 5, 7 suitably comprises two bifilar wound coils.

Figure 3:
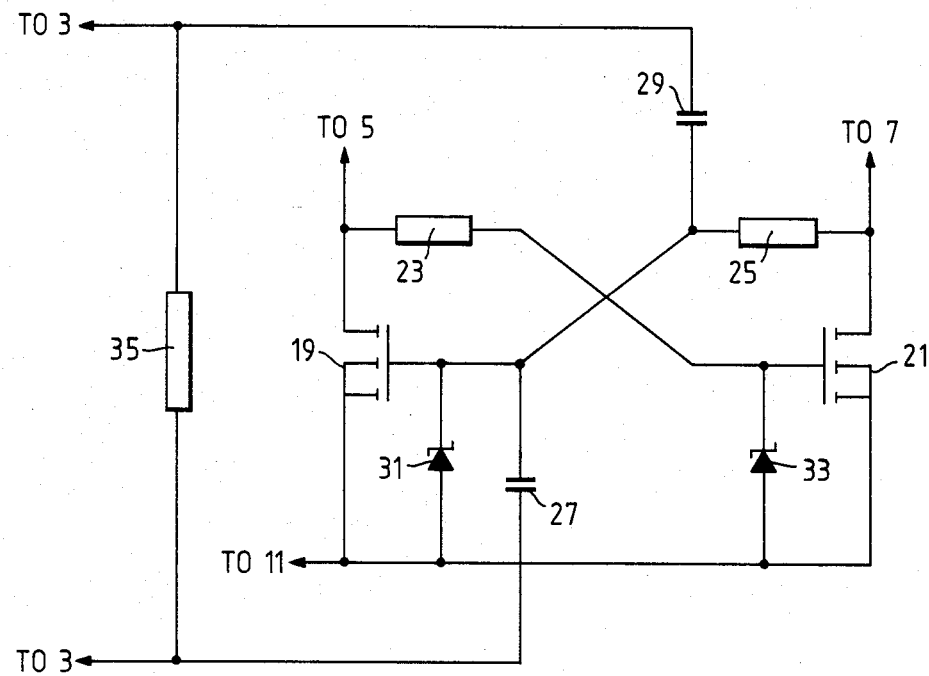
FIG. 3 is a circuit diagram of a switching arrangement and control means forming part of the motor of FIG. 1.

FIG. 3 shows one suitable arrangement for the switching arrangement comprising switches 9 and 13 and the control circuit 15 of FIG. 1. In this arrangement the switches comprise MOS field effect transistors 19 and 21 whose gates and drains are cross-connected via resistors 23 and 25 to form a bistable circuit arrangement. Trigger control means for the bistable circuit is provided in the form of two capacitors 27 and 29 respectively connected between opposite sides of the supply 3 and the gates of the transistors 19 and 21.

Each of the transistors 19 and 21 has a Zener diode 31 or 33 connected between its gate and source to prevent the transistor gates being overvolted, and a non-linear resistance 35 is connected across the supply 3 to provide voltage spike suppression.

Figure 4:
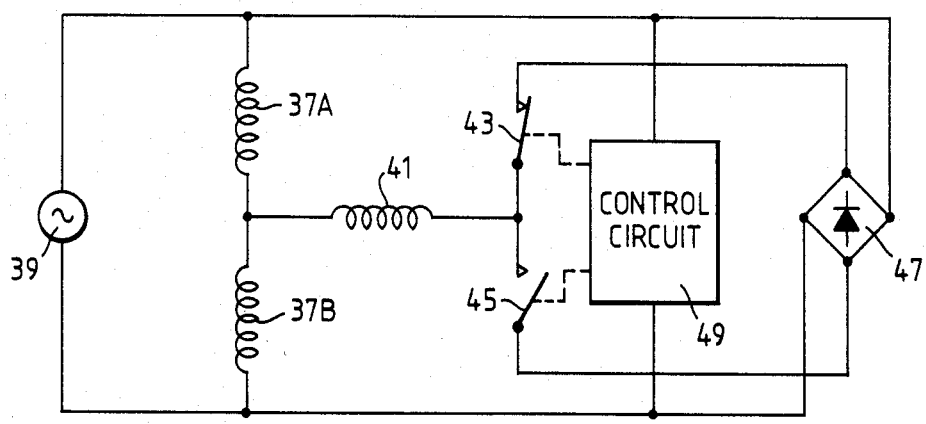
FIG. 4 is a circuit diagram of the second motor to be described.

Referring now to FIG. 4, the second motor to be described comprises a center-tapped main first stator winding 37A, 37B arranged for energisation from an alternating current supply 39.

The stator is also provided with a second winding 41 which is connected between the center tap of winding 37 and the junction between two semiconductor switches 43 and 45 connected in series between the output terminals of a bridge full wave rectifying arrangement 47 whose input terminals are connected with the supply 39. The switches 43 and 45 are operated by a control circuit 49.

In operation of the motor the switches 43 and 45 operate under control of control circuit 49 so as to conduct alternately, the switch 43 becoming conducting near each peak of one set of alternate half cycles of the voltage of the supply 39, and the switch 45 becoming conducting near each peak of the other set of alternate half cycles of the supply 39.

Across each half 37A or 37B of the main winding there appears half of the voltage of the supply 39. When the switch 43 is conducting the voltage across either the winding 37A or 37B is applied across the winding 41 via the rectifier bridge 47, the bridge serving to make the polarity of the voltage across the winding 41 of the same polarity at all times. Hence due to the periods of conduction of switch 43, a voltage of waveform as illustrated in FIG. 2c, but of half the amplitude, appears across the second winding 41.

Similarly, when the switch 45 is conducting, a voltage of the opposite polarity to that when switch 43 is conducting is applied across the winding 41 from the winding 37A or 37B via the rectifier bridge 47. Hence, due to the periods of conduction of switch 45 a voltage of waveform as illustrated in FIG. 2d, but of half the amplitude, appears across winding 41.

Hence, a total voltage of the form illustrated in FIG. 2e appears across winding 41, thus providing the required quasi second phase required for self starting of the motor.

Figure 5:
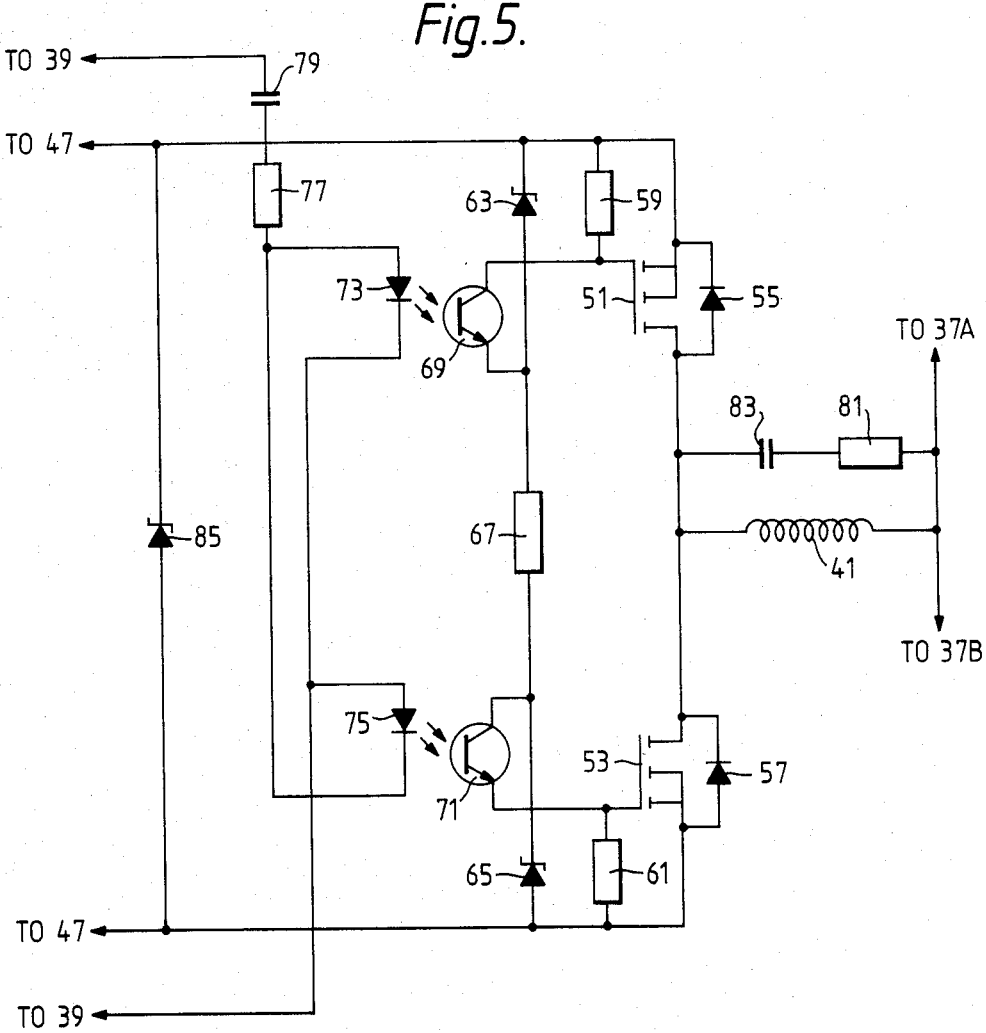
FIG. 5 is a circuit diagram of a switching arrangement and control means forming part of the motor of FIG. 4.

FIG. 5 shows one suitable form for the switching arrangement comprising switches 43 and 45 and the control circuit 49 in FIG. 4. In this arrangement the switches comprise MOS field effect transistors 51 and 53 each having an inverse voltage protection diode 55 or 57 connected between its source and drain.

The transistors 51 and 53 are driven respectively by the voltages developed across two resistors 59 and 61 each connected between the source and gate of the associated transistor. The peak voltages developed across the resistors 59 and 61 are respectively determined by two Zener diodes 63 and 65 connected in series with a resistor 67 between the output terminals of the bridge rectifier 47, the currents in the resistors 59 and 61 being controlled by two photo-transistors 69 and 71 each having its current path connected in series with the associated resistor 59 or 61 across the associated Zener diode 63 or 65.

The transistors 69 and 71 are, in turn, respectively controlled by the light outputs of two light emitting diodes 73 and 75, the diodes 73 and 75 each being separately connected in series with a resistor 77 and a capacitor 79 across the supply 39, but with reverse polarity so as to be lit alternately.

The values of the capacitor 79 and resistor 77 are chosen so that the diodes 73 and 75 are lit, and hence the transistors 69 and 71 and 51 and 53 are rendered conducting alternately at the required periods relative to the waveform of the supply voltage.

To provide the switching arrangement with a less reactive load impedance than the windings 37 and 41 a resistor 81 and a capacitor 83 are connected in series across the winding 41.

A Zener diode 85 connected across the output terminals of the bridge rectifier 47 provides voltage spike suppression.

It is pointed out that whilst in the arrangements described above by way of example with reference to FIGS. 1 to 5 the switches 9 and 13 or 43 and 45 operate at about the peaks of the supply voltage, this is not necessarily the case. Thus in some arrangements it may for example be desirable to have a dead space between one switch becoming non-conducting and the other switch becoming conducting. Furthermore, it may be desirable for the conduction periods of one switch to be shorter than those of the other switch to compensate for differences in the two windings.

Figure 6:
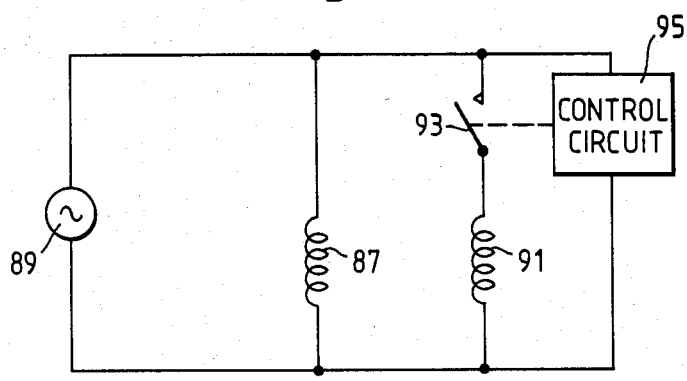
FIG. 6 is a circuit diagram of the third motor to be described.

Referring now to FIG. 6, the third motor to be described comprises a first stator winding 87 arranged for energisation from an alternating current supply 89.

The stator is also provided with a second winding 91 connected across the supply 89 via a bidirectional semiconductor switch 93, e.g. a triac, the switch 93 being controlled by a control circuit 95 synchronised with the supply.

In operation the supply voltage (FIG. 7a) appears across the first winding 87.

Figure 7:
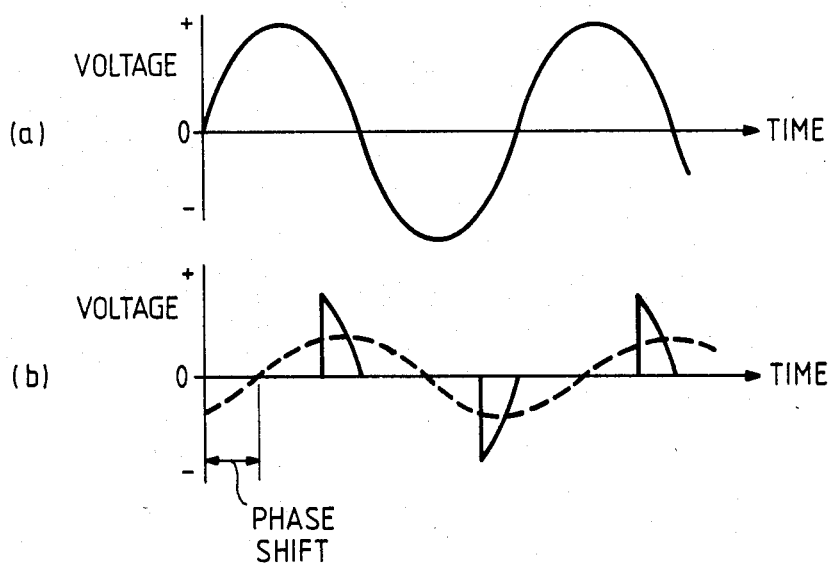
FIG. 7 illustrates the waveforms of certain voltages appearing in the motor of FIG. 6 in operation.

The control circuit 95 is arranged to close the switch 93 shortly before each zero crossing in the supply voltage and open the switch 93 at the following zero crossing to provide a sequence of voltage pulses of alternate polarity across the second winding 91, as illustrated in FIG. 7b. As illustrated by the dotted line in FIG. 7b, the second winding voltage has a fundamental component phase shifted with respect to the main winding voltage by about 90°, thus providing the quasi second phase required for self-starting of the motor.

Figure 8:
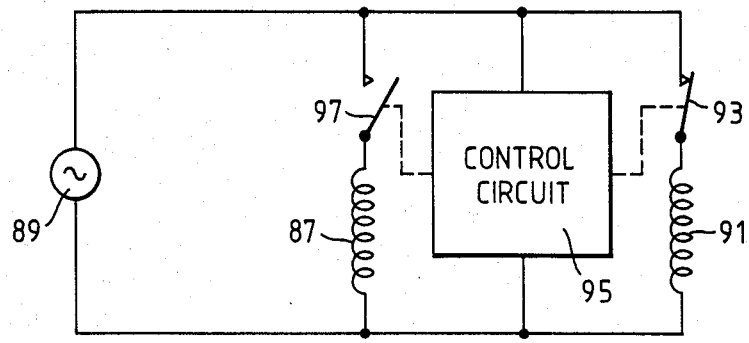
FIG. 8 is a circuit diagram of the fourth motor to be described.

Referring now to FIG. 8, the fourth circuit is identical to that shown in FIG. 6 except that a second semiconductor switch 97 controlled by the control circuit 95 is connected in series with the first winding 87.

In operation the control circuit 95 closes the switch 97 at each zero crossing of the supply voltage and opens the switch 97 at about each peak of the supply voltage to provide a voltage across the winding 87 of waveform as shown in FIG. 9a. In addition, the control circuit 95 closes the switch 93 at about each peak of the supply voltage and opens the switch 93 at or near each zero crossing of the supply voltage to provide a voltage across winding 91 of waveform as shown in FIG. 9b.

Figure 9:
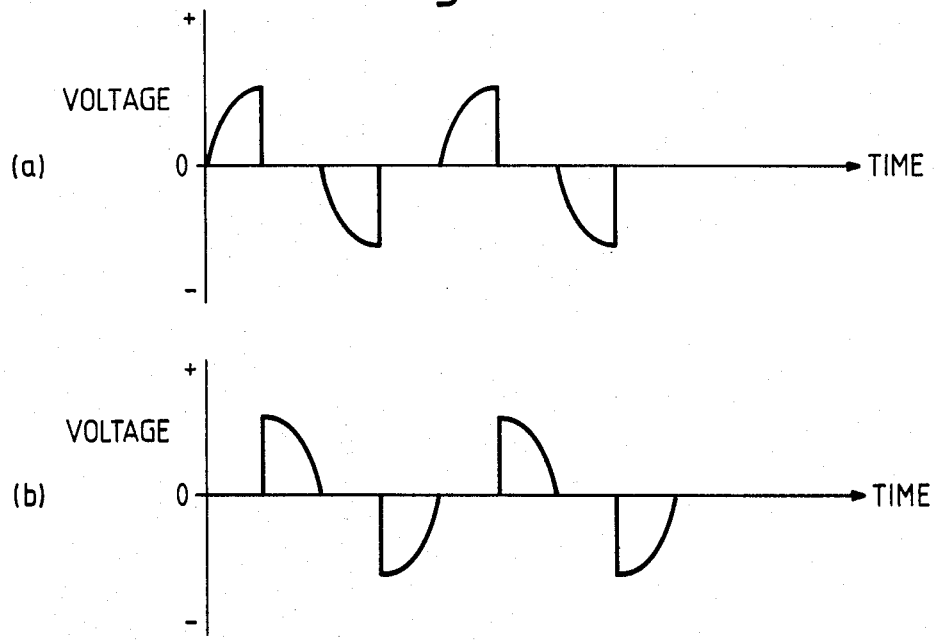
FIG. 9 illustrates the waveforms of certain voltages appearing in the motor of FIG. 8 in operation.

As is apparent from FIG. 9, a much more balanced quasi two-phase supply is thus provided than by the arrangement of FIG. 6.

It will be appreciated that in a motor according to the invention one of the windings may be disconnected once the motor has started. Where only one winding is switched, as in the arrangement of FIGS. 1, 4 and 6 the disconnected winding is conveniently the switched second winding, thereby avoiding excessive heating of the motor due to the poor waveform of the voltage applied to the second winding. However, in an arrangement where both windings are switched, as in the arrangement of FIG. 8, either winding may be disconnected. The on-time of the other winding may then suitably be increased.

It will further be appreciated that in a motor according to the invention the control means, in addition to being arranged to operate the switching arrangement to provide a starting torque, may also be arranged to obtain starting in either direction, thus providing a reversible motor. For example, in the arrangements of FIGS. 1 and 4 reversing can be obtained simply be reversing the phase of operation of the switching arrangement with respect to the supply voltage. Similarly reversing can be obtained by reversing the phase of both switching arrangements in the arrangement of FIG. 8, or by altering the phase of the switching arrangement, e.g. by about 90°, in the arrangement of FIG. 6.

I claim:

1. A single phase induction motor comprising: a first winding arranged for energization from a single phase supply; an electronic switching arrangement; a second winding arranged for energization from said supply via said electronic switching arrangement; and control means arranged to control the operation of said switching arrangement in synchronism with the supply so that the phases of the voltages across said first and second windings differ by an amount sufficient to provide a starting torque, and wherein said second winding comprises two portions, said switching arrangement comprises two switches each connected in series with a respective one of said second winding portions across said supply and said control means is responsive to the supply to render said switches conducting alternately with a changeover from conduction of one switch to conduction of the other switch occurring during each half cycle of the supply voltage, said two portions of the second winding providing, when energized, magnetic fields of opposite sense.

2. A single phase induction motor comprising: a first winding arranged for energization from a single phase supply; an electronic switching arrangement; a second winding arranged for energization from said supply via said electronic switching arrangement; and control means arranged to control the operation of said switching arrangement in synchronism with the supply so that the phases of the voltages across said first and second windings differ by an amount sufficient to provide a starting torque, and wherein said second winding comprises two portions, said switching arrangement comprises two transistors connected in a bistable circuit arrangement with each transistor having its main current path connected in series with a respective one of said two portions of the second winding across said supply via a full wave rectifying arrangement, and said control means comprises means to trigger the bistable circuit arrangement during each half cycle of the supply voltage, said two portions of the second winding providing, when energized, magnetic fields of opposite sense.

3. A single phase induction motor comprising: a first winding arranged for energization from a single phase supply; an electronic switching arrangement; a second winding arranged for energization from said supply via said electronic switching arrangement; and control means arranged to control the operation of said switching arrangement in synchronism with the supply so that the phases of the voltages across said first and second windings differ by an amount sufficient to provide a starting torque, and wherein said first winding has a tapping point, said switching arrangement comprises two switches connected in series between the output terminals of a full wave rectifying arrangement whose input terminals are connected with said supply, said second winding has one end connected to said tapping point of the first winding and its other end connected to the junction between said switches, and said control means comprises means to cause said switches to conduct alternately with a changeover from conduction of one switch to the other during each half cycle of the supply voltage.

4. A motor according to claim 3, wherein said switches comprise transistors.

5. A motor according to claim 3, wherein said control means includes two light sources connected with said supply so as to energized alternately, and a pair of photo transistors responsive to the light output of said sources to control said switches.

* * * * *